(12) United States Patent
Chiu (10) Patent No.: US 6,516,846 B2
(45) Date of Patent: Feb. 11, 2003

(54) FLAT-PROOF RIM FOR A PNEUMATIC TYRE OF A WHEEL

(76) Inventor: Yu-Pu Chiu, No. 91, Sec. 2, Kuochi Rd., Taoyuan City, Taoyuan Hsien (TW)

( * ) Notice: Subject to any disclaimer, the term of this patent is extended or adjusted under 35 U.S.C. 154(b) by 45 days.

(21) Appl. No.: 09/884,186

(22) Filed: Jun. 18, 2001

(65) Prior Publication Data

US 2002/0189732 A1 Dec. 19, 2002

(51) Int. Cl.$^7$ ............................. B60C 17/04; B60C 17/06
(52) U.S. Cl. ........................................ 152/158; 152/520
(58) Field of Search ............................. 152/520, 158

(56) References Cited

U.S. PATENT DOCUMENTS 2,426,628 A * 9/1947 Malen ........................ 152/158

* cited by examiner

Primary Examiner—Adrienne C. Johnstone
(74) Attorney, Agent, or Firm—Dellett & Walters (57) ABSTRACT

A flat-proof rim for a pneumatic tire of a wheel is disclosed. The flat-proof rim includes a circular rim body having an outer periphery. A plurality of spaced linkages are arranged along and movably connected to the outer periphery of the rim body, and each have a hoof adapted to be movable between a radially inner position and a radially outer position relative to the rim body. In addition, there is provided an apparatus for driving the linkages so that the hoofs are moved from the radially inner positions to the radially outer positions when the pneumatic tire is deflated while the wheel is rotated at a high speed.

16 Claims, 9 Drawing Sheets

FLAT-PROOF RIM FOR A PNEUMATIC TYRE OF A WHEEL

BACKGROUND OF THE INVENTION

1. Field of the Invention

The present invention relates to a flat-proof rim for a pneumatic tyre of a wheel and, more particularly, to such a flat-proof rim in which a plurality of hoofs are moved radially outward only when the tyre is deflated while the wheel is rotated at a high speed.

2. Description of Related Art

Pneumatic tyres are widely used in vehicles, including cars, trucks and even airplanes. Such tyres have an excellent property of absorbing shocks which occur inevitably when the vehicles are traveling on roads or runways after landing. On the other hand, the pneumatic tyres may explode, especially as the vehicles are being driven at a high speed, such as on thruways.

This is because between the tyre and an incorporating rim there is a sealed annular space fill with pressurized air, which does provide the shock-absorbing property. The pressurized air will become hotter, due to the friction between the rotating tyre and the road, resulting in an increased pressure in the space. The higher the speed of the vehicle is, the higher the pressure in the space will be. Then, the tyre explodes when the pressure surpasses a predetermined limit.

For example, a car normally travels on a thruway at a speed up to 60 miles per hour and if one of its tyre explodes and is deflated, the speeding car becomes unstable and possibly out of control whereby a serious accident may occur. It is the same for the trucks and the buses on the thruway, and the landing airplane on the runway, which all involve high speeds.

One of the solutions to the problem is disclosed in a flat-proof rim that includes a ring bushing, made of a material such as nylon, plastic, metal and the like, provided around an outer periphery of a rim body behind a tyre. The ring bushing is normally spaced from the tyre, but supports it if the tyre has been deflated accidentally. The ring bushing, however, is retained in place by the tyre and it will separate from the rim body soon after the tyre explodes.

Another flat-proof rim is also known that includes a plurality of inert hoofs connected in series around an outer periphery of a rim body. Although these hoofs can be into contact with the ground to protect the rim body after the explosion of the tyre, they project from the rim flanges, which makes the tyre difficult to be assembled with and disassembled from the rim body unless special tools are used.

Therefore, it is an objective of the invention to provide a flat-proof rim for a pneumatic tyre of a wheel to mitigate and/or obviate the aforementioned problems.

SUMMARY OF THE INVENTION

The object of the present invention is to provide a flat-proof rim in which a plurality of hoofs can be moved radially outward when the tyre is deflated while the wheel is rotated at a high speed.

Another object of the present invention is to provide a flat-proof rim in which a tyre may be assembled therewith and disassembled therefrom easily.

Other objects, advantages and novel features of the invention will become more apparent from the following detailed description when taken in conjunction with the accompanying drawings.

DETAILED DESCRIPTION OF THE PREFERRED EMBODIMENT

The figures show a preferred embodiment of a flat-proof rim in accordance with the present invention for a pneumatic tyre of a wheel.

Figure 1:
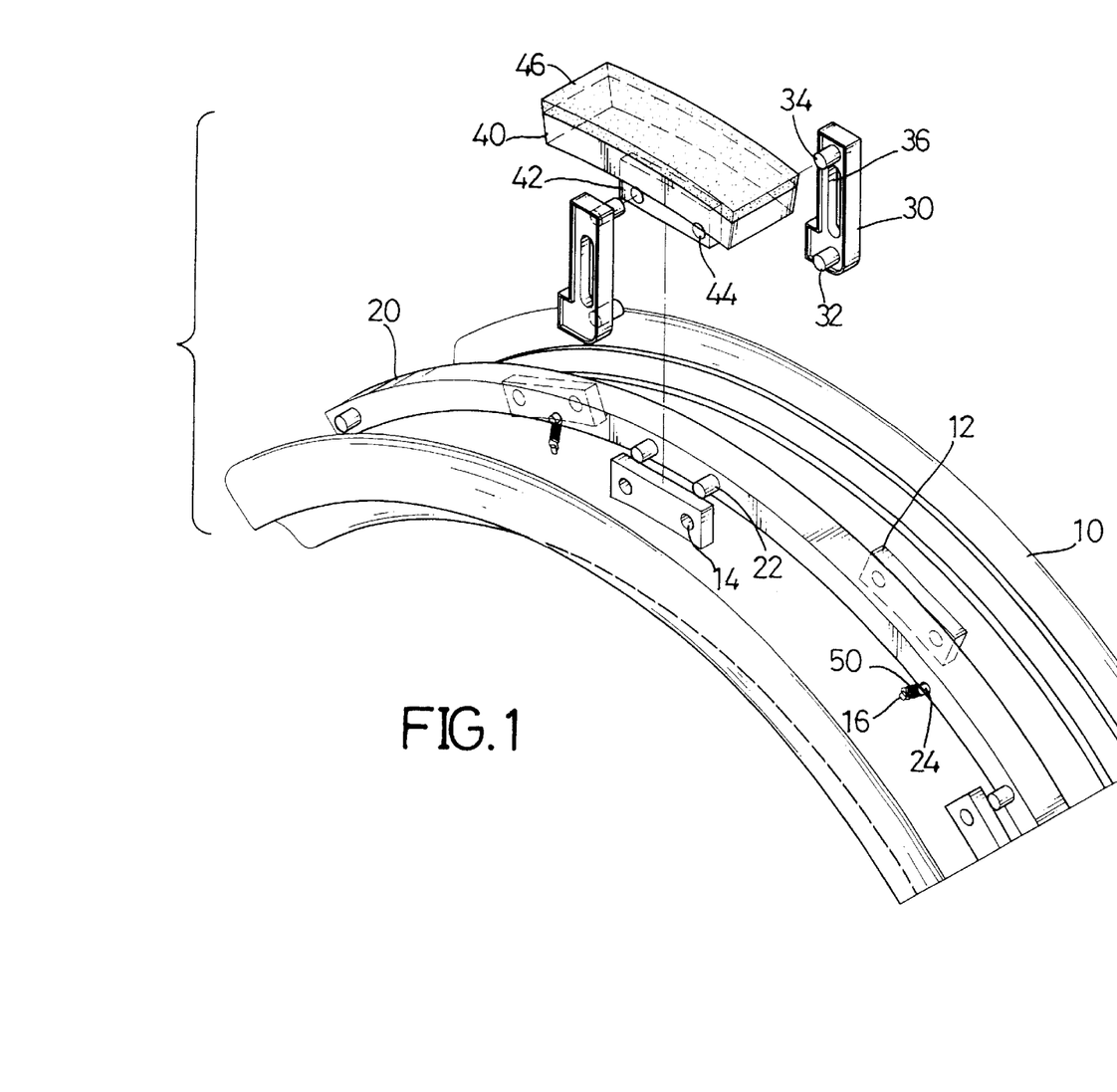
FIG. 1 is a fragmentary, exploded perspective view of a preferred embodiment of a flat-proof rim in accordance with the present invention for a pneumatic tyre of a wheel.

Referring to FIG. 1, the inventive flat-proof rim includes a circular rim body (10) having an outer periphery formed with a plurality of radially extending fins (12). Each of the fins (12) has a pair of apertures (14) defined therein.

Arranged along and movably connected to the outer periphery of the rim body (10) are plurality of spaced linkages (only one is shown), each having a pair of arms (30) and a hoof (40). The hoof (40), preferably covered with a rubber shoe (46) at its outer face, includes an inwardly extending extension (42) that defines a pair of orifices (44) therein.

Each of the arms (30) has a first end formed with an inner integral pintle (32) and a second end formed with an outer integral pintle (34), with a longitudinal slot (36) defined between the first and second ends. The first ends of the two arms (30) are pivotally connected to the outer periphery of the rim body (10) by extending the radially inner pintles (32) into the apertures (14) of the same the fins (12). The second ends of the two arms (30) are pivotally connected to the hoof (40) by extending the outer integral pintles (34) into the orifices (44) of the extension.

Figure 2:
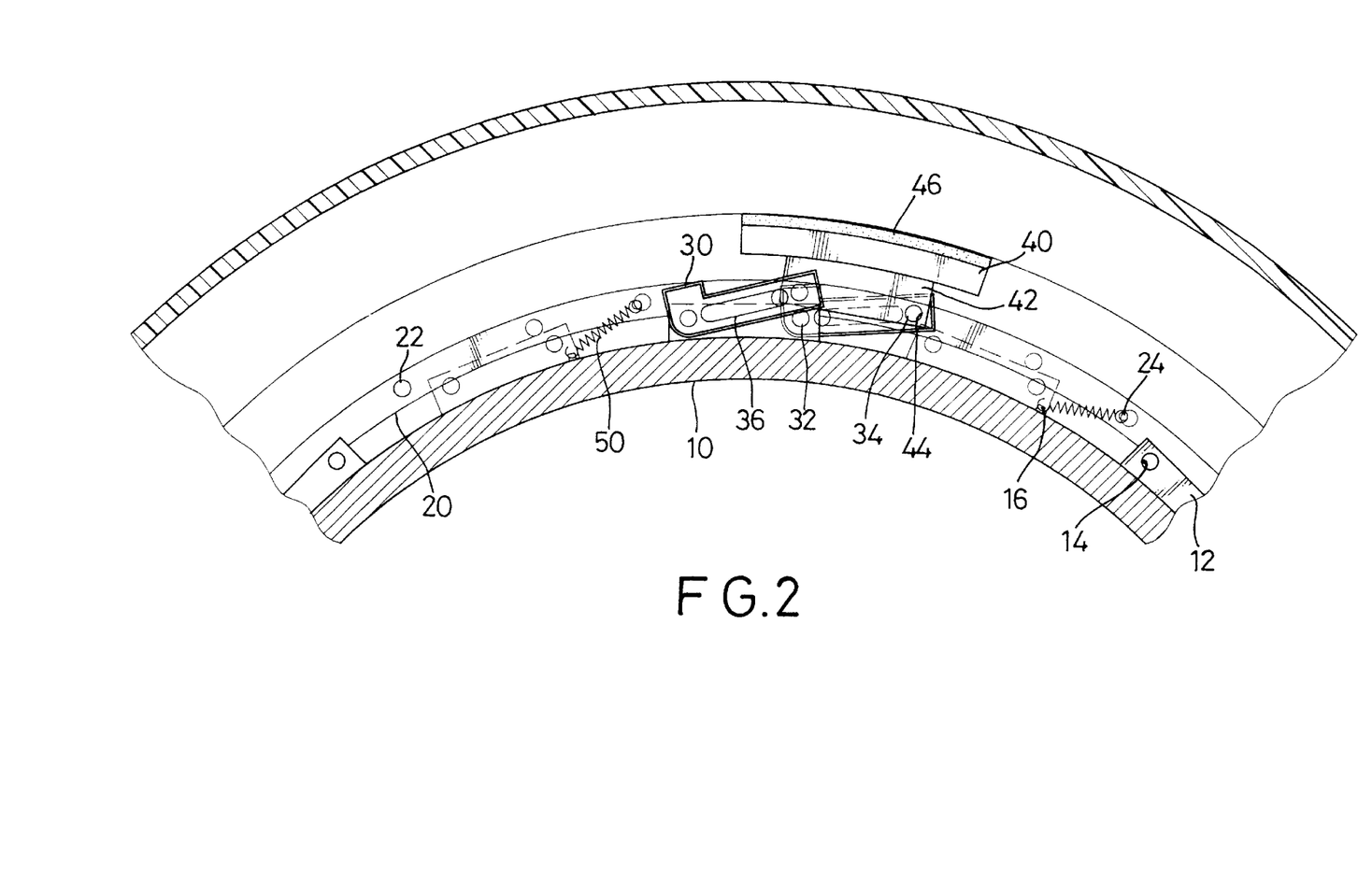
FIG. 2 is a fragmentary cross-sectional view of the flat-proof rim of FIG. 1, showing a hoof in its radially inner position relative to a rim body.
Figure 6:
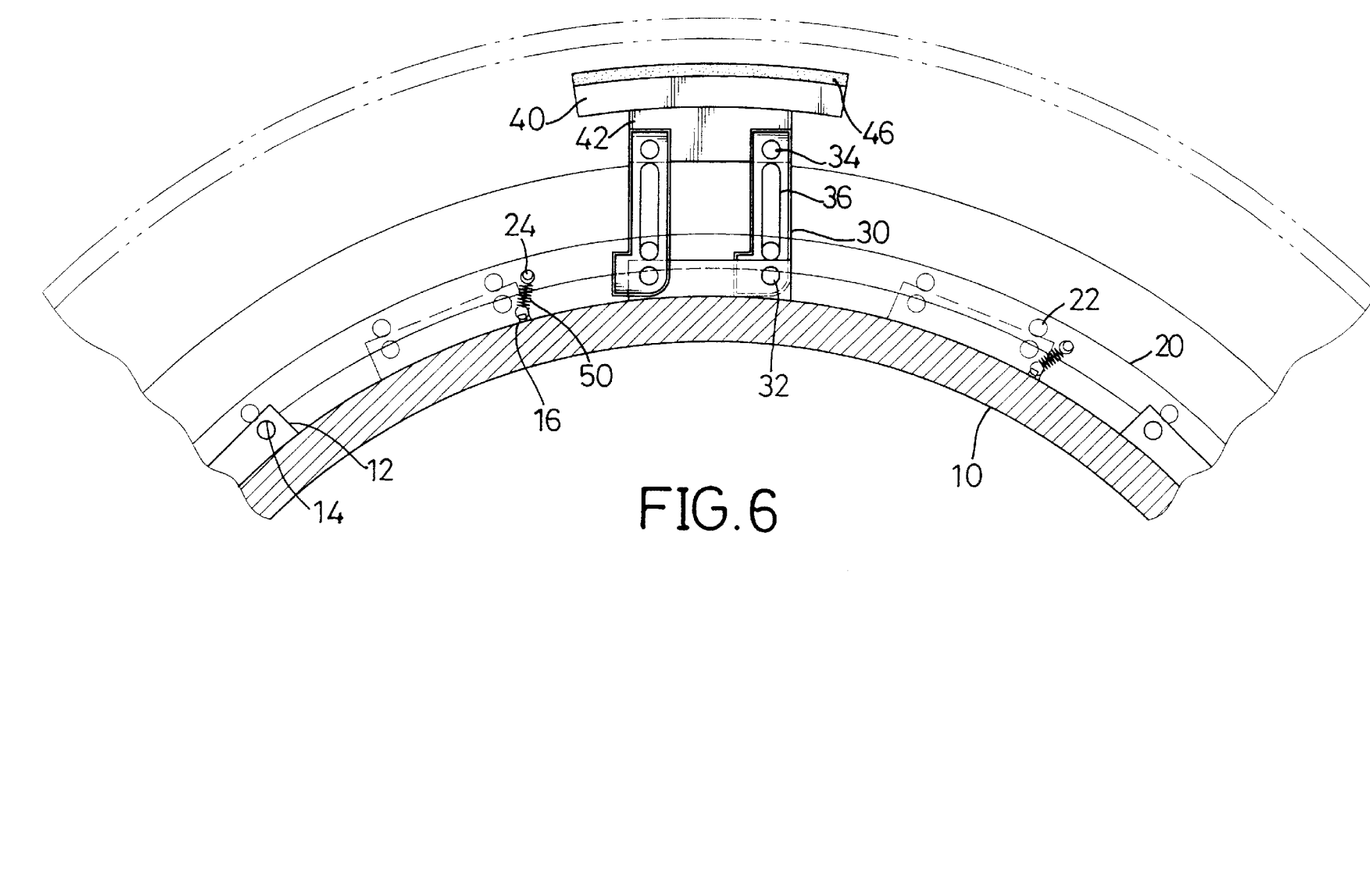
FIG. 6 is a fragmentary cross-sectional view similar to FIG. 2, but showing the hoof in its radially outer position relative to the rim body.

It is to be appreciated that the hoof (40) can be moved relative to the rim body (10) from a radially inner position, as shown in FIG. 2, to a radially outer position, as shown in FIG. 6, when the arms (30) of the linkage are driven to be turned.

Referring to FIG. 2, an apparatus is provided for driving the arms (30) of the linkages when the pneumatic tyre is deflated while the wheel is rotated at a high speed.

In the illustrated embodiment, the apparatus includes a ring (20) disposed rotatably around the rim body (10) and formed with a plurality of lateral pins (22). Two of the pins (22) are movable along the longitudinal slots (36) of the two arms (30) respectively, and so the arms (30) can be driven by turning the ring (20) round the rim body (10).

Figure 3:
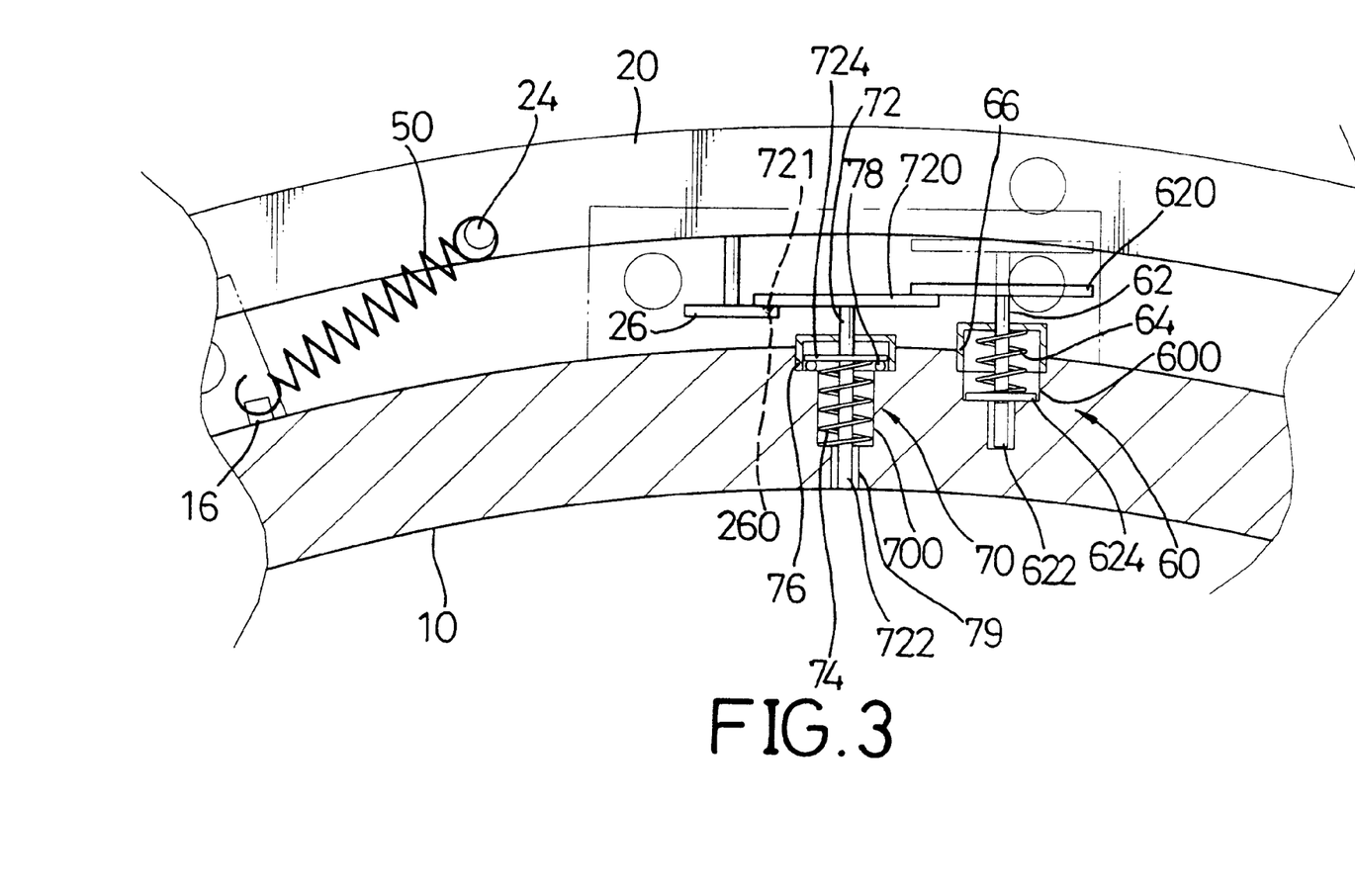
FIG. 3 is a fragmentary cross-sectional view of the flat-proof rim of FIG. 1, showing both a first T-shaped member of a pressure-controlled unit and a second T-shaped member of a centrifugaly-controlled unit in their retracted position, and showing a ring in its first angular position around the rim body.

To this end, the ring (20) is spring-loaded, such as by a spring (50) stretched between loops (16, 24) of the rim body (10) and the ring (20), as best shown in FIG. 3. The ring (20) will be turned round the rim body (10) from a first angular position, in which the hoof (40) is in its radially inner position, to a second angular position, in which the hoof (40) is its radially outer position, whenever being released from the first angular position.

Referring to FIG. 3, the apparatus further includes a pressure-controlled unit (70) that normally retains the ring (20) in the above-mentioned first angular position until the pneumatic tyre is deflated, and a centrifugaly-controlled unit (60) that allows the pressure-controlled unit (70) to release the ring (20) only while the wheel is rotated at a high speed.

The pressure-controlled unit (70) is partially received in a first stepped chamber (700) which is defined in the outer periphery of the rim body (10) and is formed with a passage (79) in communication with the atmosphere. The pressure-controlled unit (70) includes a first T-shaped member (72), a first cap (76) and a first helical spring (74).

The T-shaped member (72) h as a first tangential bar (720), a first radial post (722) extending from the first tangential bar (720) into the first stepped chamber (700), and a first disk (724) fixed on the first radial post (722). The first cap (76) is movably mounted around the first radial post (722) between the first tangential bar (720) and the first disk (724), and is fastened to the rim body (10) as to confine the first disk (724) in the first stepped chamber (700). The first helical spring (74) is compressed between the first disk (724) and a first step formed in the first stepped chamber (700). Additionally, there is a gasket (78) for providing a seal engagement between the disk (724) and a first stepped wall of the first stepped chamber (700).

Additionally, the rim (20) is formed with an integral tab (26) defining a recess (260), and the first tangential bar (720) i s formed with a boss (721) engagable with the recess (260) of the tab (26).

The centrifugaly-controlled unit (60) is partially received in a second stepped chamber (600) which is also defined in the outer periphery of the rim body (10). The centrifugaly-controlled unit (60) includes a second T-shaped member (62), a second cap (66) and a second helical spring (64).

The second T-shaped member (62) has a second tangential bar (620), a second radial post (622) extending from the second tangential bar (620) into the second stepped chamber (600), and a second disk (624) formed on the second radial post (622). The second cap (66) is movably mounted around the second radial post (622) between the second tangential bar (620) and the second disk (624), and is fastened to the rim body (10) so as to confine the second disk (624) in the second stepped chamber (600). The second helical spring (64) is compressed between the second disk (624) and the second cap (66).

With the inventive rim being assembled, the second T-shaped member (672) is located in a first retracted position in which the first tangential bar (720) retains the ring (20) in the above-mentioned first angular position, with the boss (721) of the first tangential bar (720) engaged with the recess (260) of the tab (26) of the ring (20). This is because the second T-shaped member (672) is located in a second retracted position and the second tangential bar (620) retains the first T-shaped member (72) in the first retracted position, as the second helical spring (64), which tends to move the second T-shaped member (62) to the second retracted position, is selected to exert more action than that of the first helical spring (74), which tends to move the first T-shaped member (72) away from the first retracted position.

Once the pneumatic tyre is inflated, the first disk (724) of the first T-shaped member (72) is pressed against the first stepped wall, via the gasket (78), by the difference of pressures between the compression air in the tyre and the atmosphere. The difference of pressures ensures the security of the first T-shaped member (72) in the first retracted position, no matter whether the second T-shaped member (62) is either in or away from the second retracted position.

Figure 4:
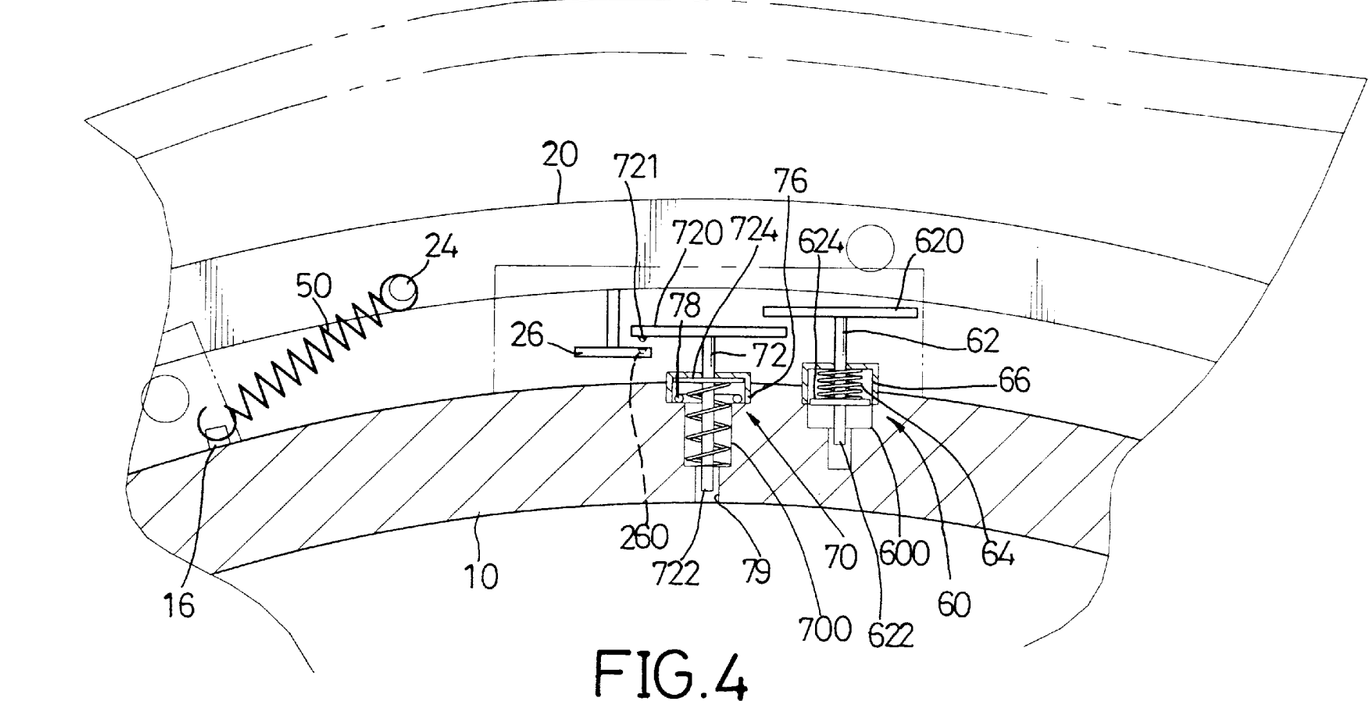
FIG. 4 is a fragmentary cross-sectional view of the flat-proof rim of FIG. 1, showing both the first T-shaped member of the pressure-controlled unit and the second T-shaped member of the centrifugaly-controlled unit moved away from their retracted position immediately after a tyre incorporated with the rim is deflated while the wheel provided with the rim and the tyre is rotated at a high speed.

Referring to FIG. 4, the second T-shaped member (62) is moved away from its retracted position, against the action of the second spring (64), by the centrifugal force only when the wheel is rotated at a high speed. Now the second T-shaped member (62) releases the first T-shaped member (72), which, however, still remains in the first retracted position by the difference of pressures, as mentioned above.

If the tyre is then deflated accidentally, such as resulting from its explosion on a thruway, the difference of pressures is sharply reduced. As a result, the first T-shaped member (72) will be moved away from its retracted position, by the action of the first helical spring (74) and additionally by the centrifugal force, making the boss (721) of the first tangential bar (720) to disengage from the recess (260) of the tab (26), i.e. releasing the ring (20).

Figure 5:
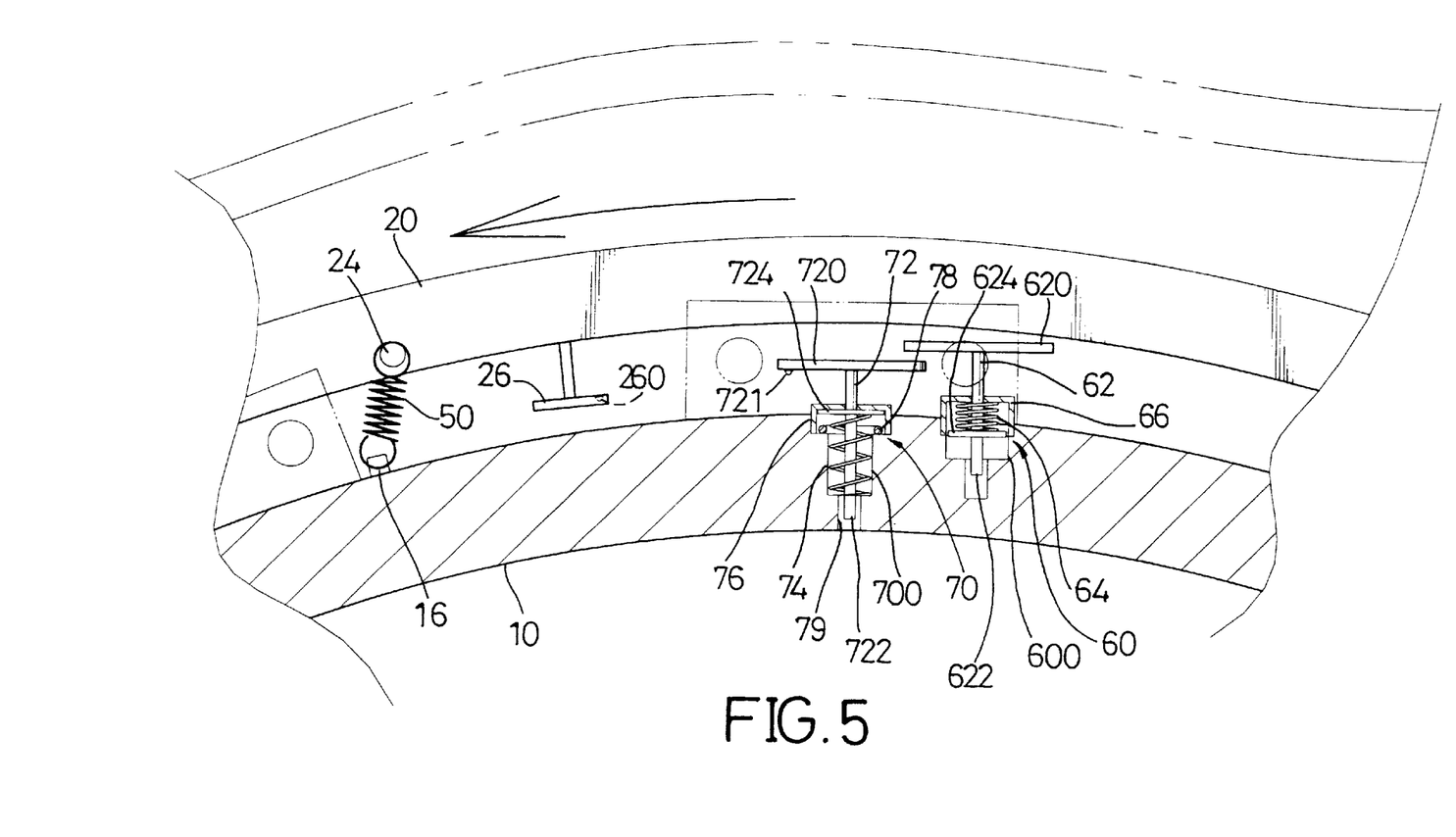
FIG. 5 is a fragmentary cross-sectional view of the flat-proof rim of FIG. 1, showing the ring being turned round the rim body from its first angular position, as shown in FIG. 3, to its second angular position.
Figure 7:
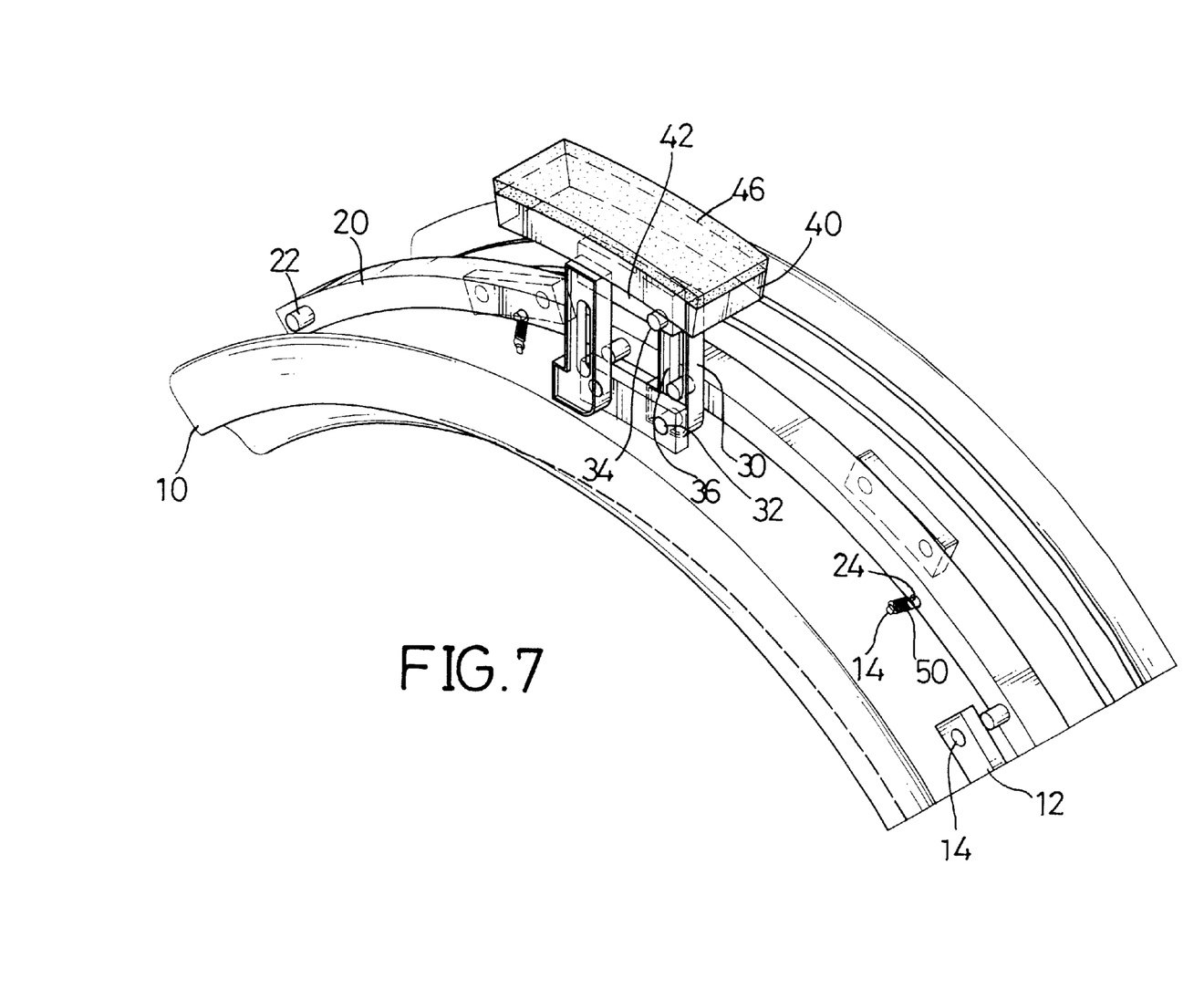
FIG. 7 is a fragmentary perspective view of the flat-proof rim of FIG. 1, showing the hoof in its radially outer position relative to the rim body.

Referring to FIGS. 5, 6 and 7, now the released ring (20) is turned round the rim body (10), by the action of the stretched spring (50), from its first angular position, as shown in FIG. 4, to its second angular position, as shown in FIG. 5, by the action of the stretched spring (50).

During the meantime, the pins (22) of the turning ring (20) are moved along the slots (36) of the two arms (30), driving or turning the arms (30) that in turn move the hoof (40) from its radially inner position, as shown in FIG. 2, to its radially outer position, as shown in FIG. 6.

The hoof (40) is moved not only by the action of the stretched spring (50) but also by the centrifugal force upon the linkage, including the arms (30) and the hoof (40) itself.

Figure 8:
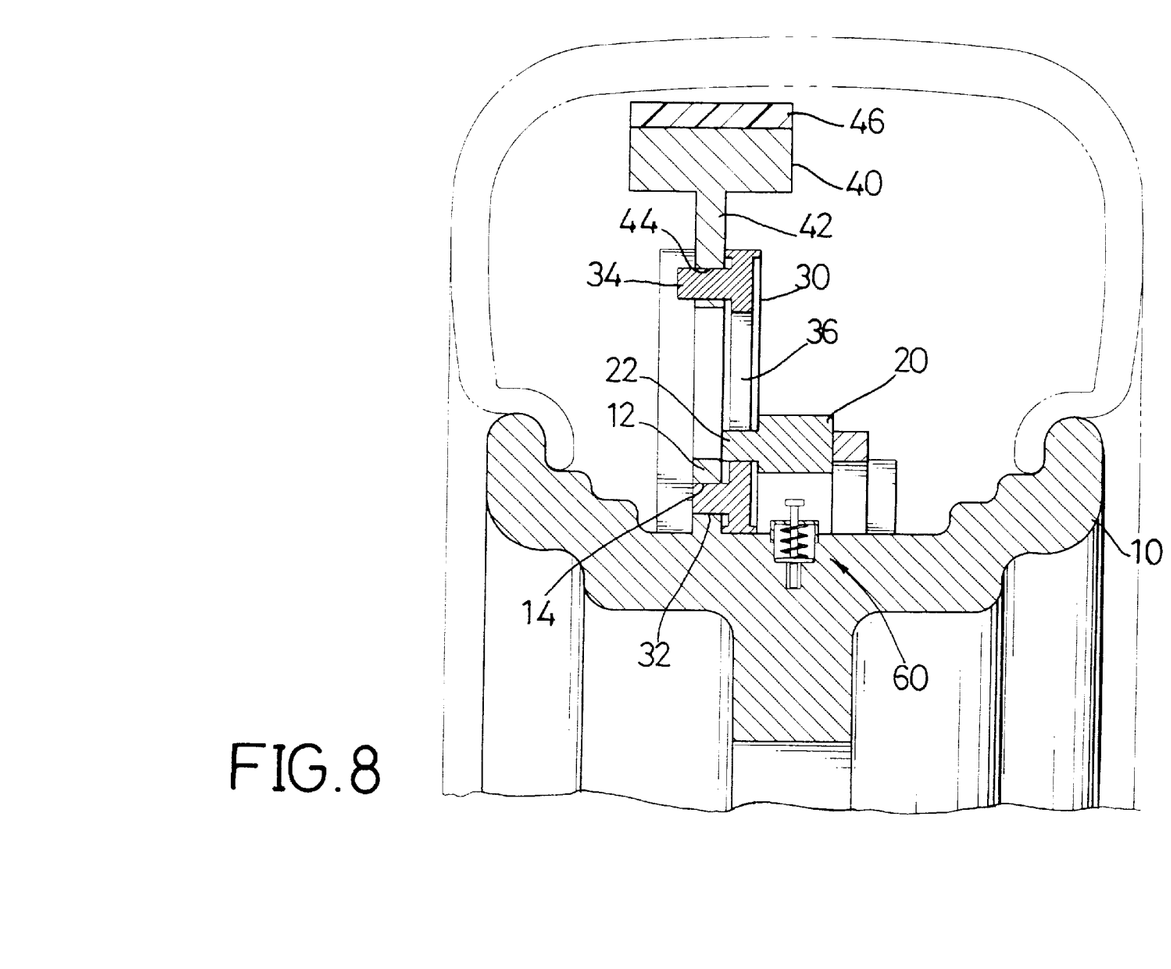
FIG. 8 is a fragmentary cross-sectional side view of the flat-proof rim of FIG. 1, showing the hoof moved behind the deflated tyre for supporting it and preventing it from excessive deformation.

Referring to FIG. 8, the hoof (40) is now positioned immediately behind the deflated tyre, supporting it and preventing it from excessive deformation.

Even if the tyre is separated from the rim after explosion of the tyre, the hoofs (40) can also touch the ground with their shoes (46), one by one, thereby avoiding the vehicle to become out of control.

Figure 9:
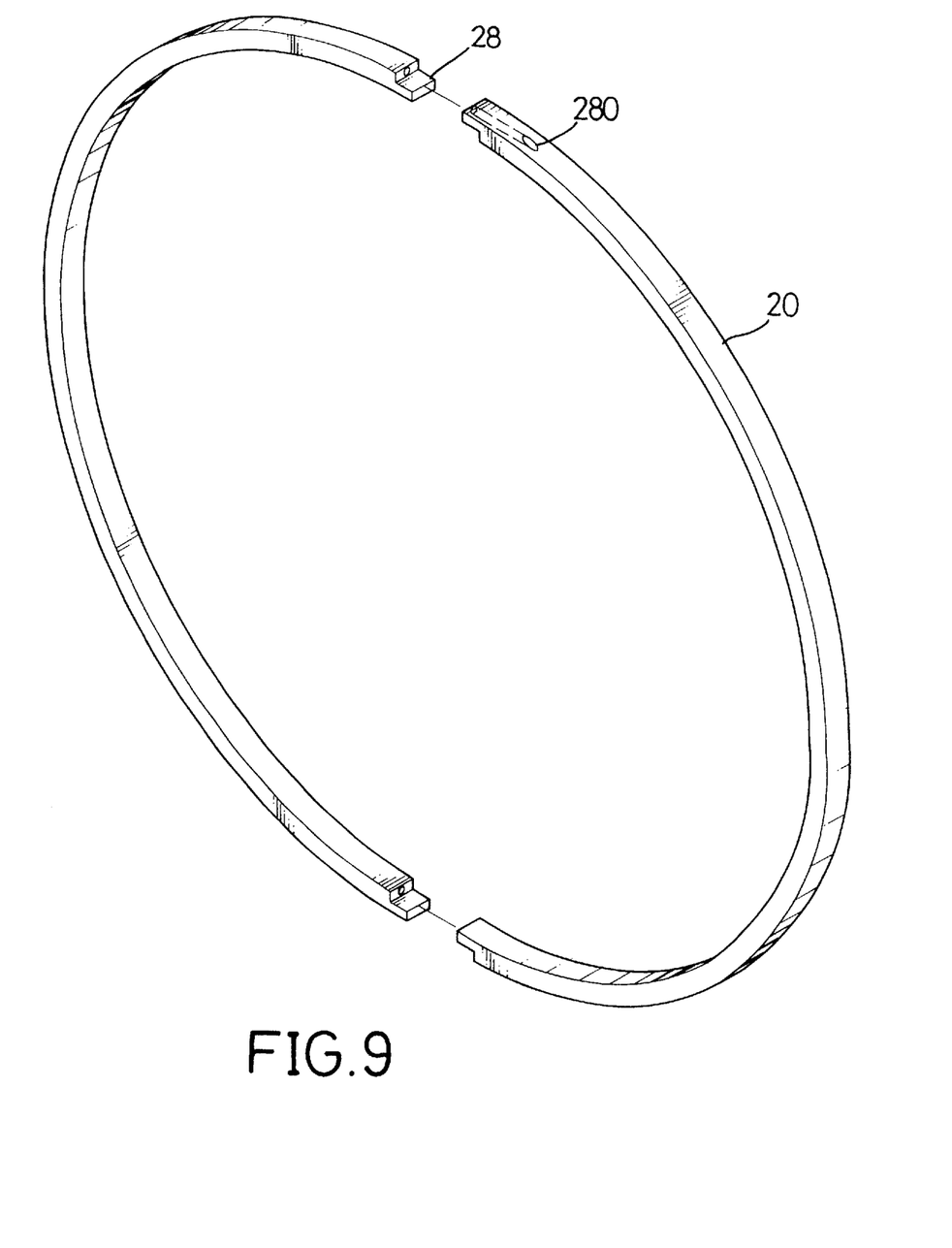
FIG. 9 is an optional embodiment of the ring, made of a pair of semicircular bands.

Referring finally to FIG. 9, the ring (20) may be formed by a pair of semicircular bands, each band having two ends (28) shaped to mate with those (28) of the other band and having two holes (280) defined in the two ends (28) in order to connect the bands together.

From the above description, it is noted that the invention has the following advantages:

1. enablement of the tyre to be assembled with and disassembled from the inventive rim easily.

Because the hoofs (40) are normally located in their radially inner positions, the tyre can be assembled and disassembled as easily as in the case of a common rim.

2. allowing the tyre to be disassembled and mended with usual tools:

Because the hoofs (40) will still be kept in their radially inner position after the tyre has exploded or even been punctured while the vehicle is being parked or being driven at a low speed, at which the disabled vehicle will not be out of control, the tyre can be mended by disassembling it with usual tools.

3. avoiding the vehicle to be out of control while being driven at a high speed:

Because the hoofs (40) will be moved to their radially outer position immediately after the tyre has exploded under the high speed condition, the tyre will be additionally supported by the hoofs (40), so as to prevent the vehicle from becoming out of control.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A flat-proof rim for a pneumatic tyre of a wheel, comprising:
    a circular rim body (10) having an outer periphery;
    a plurality of spaced linkages arranged along and movably connected to said outer periphery of said rim body (10), each of said linkages having a hoof (40) adapted to be movable between a radially inner position and a radially outer position relative to said rim body (10); and
    an apparatus for driving said linkages so that said hoofs (40) are moved from said radially inner positions to said radially outer positions when said pneumatic tyre is deflated while said wheel is rotated at a high speed.

2. The flat-proof rim as claimed in claim 1, wherein said hoof (40) has a rubber shoe (46) covering an outer face thereof.

3. The flat-proof rim as claimed in claim 1, wherein each of said linkages further includes a pair of arms (30) having first ends pivotally connected to said outer periphery of said rim body (10) and second ends pivotally connected to said hoof (40), thereby moving said respective hoof (40) from said radially inner position to said radially outer position when at least one of said arms (30) is driven by said apparatus.

4. The flat-proof rim as claimed in claim 3, wherein said rim body (10) has a plurality of fins (12) extending radially outward from said outer periphery, and wherein said first ends of said arms (30) are pivotally connected to said outer periphery of said ring body (10) at one of said fins (12).

5. The flat-proof rim as claimed in claim 4, wherein each of said hoofs (40) has an extension (42) extending radially inward therefrom, and wherein said second ends of said arms (30) are pivotally connected to said hoof (40) at said extension (42).

6. The flat-proof rim as claimed in claim 3, wherein at least one of said arms (30) has a longitudinal slot (36) defined between said ends thereof, and wherein said apparatus includes a ring (20) disposed rotatably around said rim body (10) and formed with a pin (22) movable along said longitudinal slot (36), thereby driving said at least one arm (30) and hence said linkage when said ring (20) is turned round said rim body (10).

7. The flat-proof rim as claimed in claim 6, wherein said ring (20) is spring-loaded to be turned round said rim body (10) from a first angular position, in which each of said hoofs (40) is in said radially inner position, to a second angular position, in which said hoof (40) is in said radially outer position, when said ring (20) is released from said first angular position.

8. The flat-proof rim as claimed in claim 7, wherein said apparatus includes a pressure-controlled unit (70) for retaining said ring (20) in said first angular position but releasing said ring (20) when said pneumatic tyre is deflated.

9. The flat-proof rim as claimed in claim 8, wherein a first stepped chamber (700) is defined in said outer periphery of said rim body (10) for partially receiving said pressure-controlled unit (70), and wherein said first stepped chamber (700) is formed with a passage (79) in communication with the atmosphere.

10. The flat-proof rim as claimed in claim 9, wherein said pressure-controlled unit (70) comprises:
    a first T-shaped member (72) having a first tangential bar (720), a first radial post (722) extending from said first tangential bar (720) into said first stepped chamber (700), and a first disk (724) fixed on said first radial post (722);
    a first cap (76) movably mounted around said first radial post (722) between said first tangential bar (720) and said first disk (724), said cap (76) being fastened to said rim body (10) so as to confine said first disk (724) in said first stepped chamber (700);
    a first helical spring (74) compressed between said first disk (724) and a first step formed in said first stepped chamber (700);
    a gasket (78) for providing a seal engagement between said disk (724) and a first stepped wall of said first stepped chamber (700); and
    wherein said first helical spring (74) is selected so that said first T-shaped member (72) may normally be located in a first retracted position in which said first tangential bar (720) retains said ring (20) in said first angular position and in which said first disk (724) is pressed against said first stepped wall, via said gasket (78), by the difference of pressures between the compression air in said pneumatic tyre and the atmosphere, and that said first T-shaped member (72) may be moved away from said first retracted position by the action of said first helical spring (74) and releases said ring (20) when said pneumatic tyre is deflated.

11. The flat-proof rim as claimed in claim 10, wherein ring (20) is formed with an integral tab (26) having a recess (260) defined therein, and wherein said first tangential bar (720) is formed with a boss (721) engagable with said recess (260) of said tab (26).

12. The flat-proof rim as claimed in claim 10, wherein said apparatus further includes a centrifugaly-controlled unit (60) for allowing said pressure-controlled unit (70) to release said ring (20) only while said wheel is rotated at a high speed.

13. The flat-proof rim as claimed in claim 12, wherein a second stepped chamber (600) is defined in said outer periphery of said rim body (10) for partially receiving said centrifugaly-controlled unit (60).

14. The flat-proof rim as claimed in claim 13, wherein said centrifugaly-controlled unit (60) comprises:

a second T-shaped member (62) having a second tangential bar (620), a second radial post (622) extending from said second tangential bar (620) into said second stepped chamber (600), and a second disk (624) formed on said second radial post (622);

a second cap (66) movably mounted around said second radial post (622) between said second tangential bar (620) and said second disk (624), said cap (66) being fastened to said rim body (10) so as to confine said second disk (624) in said second stepped chamber (600); and a second helical spring (64) compressed between said second disk (624) and said second cap (66);

wherein said second helical spring (64) is selected so that said second T-shaped member (672) may normally be located in a second retracted position in which said second tangential bar (620) retains said first T-shaped member (72) in said first retracted position, and that said second T-shaped member (62) may be moved away from said second retracted position by the centrifugal force and releases said first T-shaped member (72) when said wheel is rotated at a high speed.

15. The flat-proof rim as claimed in claim 6, wherein said ring (20) is formed by a pair of semicircular bands connected together.

16. The flat-proof rim as claimed in claim 15, wherein each of said semicircular bands has two ends (28) shaped to mate with ends (28) of the other one of said bands, and has two holes (280) defined in said two ends to connect said bands together.

* * * * *